United States Patent [19]

Claussen et al.

[11] Patent Number: 4,764,622

[45] Date of Patent: Aug. 16, 1988

[54] LIGHT-COLLECTING COUMARIN DERIVATIVES

[75] Inventors: Uwe Claussen, Leverkusen; Horst Harnisch, Much, both of Fed. Rep. of Germany

[73] Assignee: Bayer Aktiengesellschaft, Leverkusen, Fed. Rep. of Germany

[21] Appl. No.: 920,482

[22] Filed: Oct. 17, 1986

Related U.S. Application Data

[60] Continuation of Ser. No. 738,151, May 24, 1985, abandoned, which is a division of Ser. No. 500,795, Jun. 6, 1983, Pat. No. 4,544,496, which is a continuation of Ser. No. 406,622, Aug. 9, 1982, abandoned, which is a continuation of Ser. No. 176,383, Aug. 8, 1980, abandoned.

[30] Foreign Application Priority Data

Aug. 27, 1979 [DE] Fed. Rep. of Germany ....... 2934541
Dec. 22, 1979 [DE] Fed. Rep. of Germany ....... 2952228

[51] Int. Cl.$^4$ .................. C07D 235/18; C07D 263/56; C07D 277/66; C07D 309/34
[52] U.S. Cl. .................................... 548/159; 548/153; 548/218; 548/223; 548/327
[58] Field of Search ............... 548/153, 159, 218, 223, 548/327

[56] References Cited

FOREIGN PATENT DOCUMENTS 2844299 4/1979 Fed. Rep. of Germany ...... 548/159
867592 5/1961 United Kingdom ................ 548/159

Primary Examiner—Mary C. Lee
Assistant Examiner—J. G. Mullins
Attorney, Agent, or Firm—Sprung Horn Kramer & Woods

[57] ABSTRACT

A light-collecting system, which contains a coumarin derivative of the formula

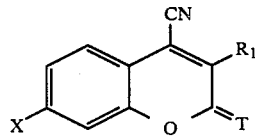

in which T denotes O or $NR_4$, $R_4$ represents hydrogen, optionally substituted aryl, cycloalkyl or aralkyl, $R_1$ denotes a carbocyclic or heterocyclic 5 or 6 membered ring bonded via a C.atom, or a 5 or 6 membered heterocyclic ring which is bonded via a N atom and is rotationally asymmetrical to an axis placed through the coumarin/N-heterocyclic bond, the 5 or 6 membered rings may carry non-ionic substituents and for an optionally substituted benzene ring or naphthalene ring to be fused to the said rings;

X signifies

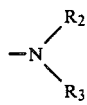

or $-OR_2'$, $R_2$ represents hydrogen, alkyl, cycloalkyl, aralkyl or aryl, hydrocarbon radicals may be substituted, and $R_3$, in addition to having the definitions given for $R_2$, also signifies a radical of the formulae

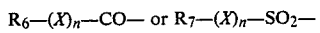

$R_6$ and $R_7$ represent alkyl, cycloalkyl, aryl or aralkyl, the hydrocarbon radicals may be substituted, X represents NH or O and n represents 0 or 1, or $R_2$ and $R_3$ together with the N atom and optionally with the inclusion of further hetero-atoms form a 5 or 6 membered ring, this ring may carry non-ionic substituents and an optionally substituted benzene ring or naphthalene ring may be fused thereto, or $R_2$ and $R_3$ together form a di-unsaturated radical of the formula

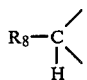

$R_8$ represents optionally substituted alkyl, aryl, cycloalkyl or aralkyl, and $R_2'$ signifies optionally substituted alkyl, alkenyl, cycloalkyl, aryl or aralkyl, and their use in light-collecting systems.

2 Claims, No Drawings

LIGHT-COLLECTING COUMARIN DERIVATIVES

This is a continuation of application Ser. No. 738,151, filed May 24, 1985, now pending, which in turn in a division of application Ser. No. 500,795, filed June 6, 1983, now U.S. Pat. No. 4,544,496, which in turn is a continuation of application Ser. No. 406,622, filed Aug. 9, 1982, now abandoned, which in turn is a continuation of application Ser. No. 176,383, filed Aug. 8, 1980, now abandoned.

BACKGROUND OF THE INVENTION

Devices for collecting diffuse electromagnetic radiation by the utilisation of fluorescence have been disclosed. The core piece of the collector is a medium which has a higher optical density than the surroundings and which contains centres capable of fluorescence (DE-OS (German Published Specification) No. 2,620,115).

The economic practicability of a light-collecting system is to a large extent determined by the suitability of the dyestuff employed therein as a light converter. Extreme demands are made with regard to the optical quality of this dyestuff [Appl. Phys. 14 123–139 (1977)].

SUMMARY OF THE INVENTION

The invention relates to new light-collecting systems, which are characterized in that they contain, as the energy converter, a courmarin derivative of the formula

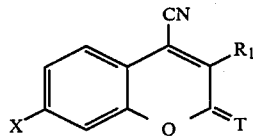
(I)

In formula (I):
T denotes O or $NR_4$,
in which
$R_4$ represents hydrogen, optionally substituted aryl, optionally substituted cycloalkyl or optionally substituted aralkyl,
$R_1$ denotes a carbocyclic or heterocyclic 5-membered or 6-membered ring bonded via a C atom, or a 5-membered or 6-membered heterocyclic ring which is bonded via a N atom and is rotationally asymmetrical to an axis placed through the coumarin/N-heterocyclic bond, it being possible for the said 5-membered or 6-membered rings to carry non-ionic substituents and for an optionally substituted benzene ring or an optionally substituted naphthalene ring to be fused to the said rings;
X signifies

or $-OR_2'$, in which $R_2$ represents hydrogen, alkyl, cycloalkyl, aralkyl or aryl, it being possible for the said hydrocarbon radicals to be substituted, and $R_3$, in addition to having the definitions given for $R_2$, also signifies a radical of the formulae $$R_6-(X_1)_n-CO_2 \text{ or } R_7-(X_1)_n-SO_2$$

in which
$R_6$ and $R_7$ represent alkyl, cycloalkyl, aryl or aralkyl, it being possible for the said hydrocarbon radicals to be substituted,
$X_1$ represents NH or O and
n represents 0 or 1, or
$R_2$ and $R_3$ together with the N atom and optionally with the inclusion of further hetero-atoms form a 5-membered or 6-membered ring, it being possible for this ring to carry non-ionic substituents and for an optionally substituted benzene ring or an optionally substituted naphthalene ring to be fused thereto, or
$R_2$ and $R_3$ together form a di-unsaturated radical of the formula

in which
$R_8$ represents optionally substituted alkyl, optionally substituted aryl, optionally substituted cycloalkyl and-/or optionally substituted aralkyl, and
$R_2'$ signifies optionally substituted alkyl, alkenyl, optionally substituted cycloalkyl, optionally substituted aryl or optionally substituted aralkyl.

$R_1$ preferably represents a 5-membered or 6-membered heterocyclic ring which contains 1, 2 or 3 hetero-atoms from the series comprising N, O and S and to which a benzene ring can be fused, it being possible for both the heterocyclic ring and the fused benzene ring to be substituted by, for example, alkyl, aryl, aralkyl, cycloalkyl, halogen, alkoxy, cyano and acyl.

Examples which may be mentioned of $R_1$ as a 5-membered or 6-membered heterocyclic ring to which a benzene ring can be fused are: pyrazole, imidazole, thiazole, oxazole, 1,2,4-triazole, 1,3,4-oxidiazole, 1,3,4-thiadiazole, benzimidazole, benzthiazole, benzoxazole and pyridine.

Particularly preferentially, $R_1$ represents a heterocyclic radical of the formula

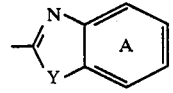

in which
Y signifies O, $NR_5$ or S and
$R_5$ represents hydrogen, alkyl, aryl, cycloalkyl or aralkyl, it being possible for the said hydrocarbon radicals to be substituted, and the ring A can be substituted by alkyl, sulphoalkyl, aryl, aralkyl, cycloalkyl, alkoxy, acyl, halogen, sulphamoyl and cyano.

In one embodiment of the invention, the ring A is substituted by, preferably, 1 to 2 substituents from the group comprising $C_1$–$C_4$-alkyl, $C_1$–$C_4$-alkoxy, bromine, chlorine, phenyl, cyclohexyl, $C_1$–$C_4$-alkylsulphonyl, sulphamoyl or $C_1$–$C_4$-alkoxycarbonyl.

$R_2$ and $R_3$ together with the N atoms and optionally with the inclusion of further hetero-atoms preferably form a 5-membered or 6-membered ring which can contain 1 or 2 further hetero-atoms from the group comprising N, O and S and to which a benzene ring can be fused, it being possible for the heterocyclic radical to be substituted both in the heterocyclic part and also in the fused benzene ring by, for example, alkyl, aryl, aralkyl, cycloalkyl, halogen, alkoxy, cyano and acyl.

Alkyl (as $R_2$, $R_2'$, $R_3$, $R_4$, $R_5$, $R_6$, $R_7$ or $R_8$, as a substituent of ring A and also as a non-ionic substituent of the 5-membered or 6-membered rings $R_1$ or of the 5-membered or 6-membered rings formed by $R_2$ and $R_3$ together with the N atom, and of the fused rings) preferably represents $C_1$–$C_6$-alkyl.

Alkenyl ($R_2'$) preferably represents allyl.

Aryl (as $R_2$, $R_2'$, $R_3$, $R_4$, $R_5$, $R_6$, $R_7$ or $R_8$, as a substituent of ring A and also as a non-ionic substituent of the 5-membered or 6-membered rings $R_1$ or of the 5-membered or 6-membered rings formed by $R_2$ and $R_3$ together with the N atom, and of the fused rings) preferably represents phenyl.

Aralkyl (as $R_2$, $R_2'$, $R_3$, $R_4$, $R_5$, $R_6$, $R_7$ or $R_8$, as a substituent of ring A and also as a non-ionic substituent of the 5-membered or 6-membered rings $R_1$ or of the 5-membered or 6-membered rings formed by $R_2$ and $R_3$ together with the N atom, and of the fused rings) preferably represents benzyl or phenethyl.

Cycloalkyl (as $R_2$, $R_2'$, $R_3$, $R_4$, $R_5$, $R_6$, $R_7$ or $R_8$, as a substituent of ring A and also as a non-ionic substituent of the 5-membered or 6-membered rings $R_1$ or of the 5-membered or 6-membered rings formed by $R_2$ and $R_3$ together with the N atom, and of the fused rings) preferably represents cyclohexyl.

Acyl (as a substituent of ring A and also as a non-ionic substituent of the 5-membered or 6-membered rings $R_1$ or of the 5-membered or 6-membered rings formed by $R_2$ and $R_3$ together with the N atom, and of the fused rings) preferably represents ($C_1$–$C_6$-alkyl)-carbonyl, benzoyl, $C_1$–$C_6$-alkylsulphonyl or phenylsulphonyl.

Halogen (as a substituent of ring A and also as a non-ionic substituent of the 5-membered or 6-membered rings $R_1$ or of the 5-membered or 6-membered rings formed by $R_2$ and $R_3$ together with the N atom, and of the fused rings) preferably represents chlorine, bromine or fluorine.

Alkoxy (as a substituent of ring A and also as a non-ionic substituent of the 5-membered or 6-membered rings $R_1$ or of the 5-membered or 6-membered rings formed by $R_2$ and $R_3$ together with the N atom, and of the fused rings) preferably represents $C_1$–$C_6$-alkoxy.

Substituted alkyl (as $R_2$, $R_2'$, $R_3$, $R_4$, $R_5$, $R_6$, $R_7$ or $R_8$) represents alkyl which can be substituted, for example, by halogen, such as chlorine and bromine, hydroxyl, cyano, trifluoromethyl, $C_1$–$C_6$-alkoxy, $C_1$–$C_6$-alkylsulphonyl, phenylsulphonyl, carbamoyl monosubstituted or disubstituted by $C_1$–$C_6$-alkyl or phenyl, carbamoyl, sulphamoyl, sulphamoyl monosubstituted or disubstituted by $C_1$–$C_6$-alkyl or phenyl, and amino monosubstituted or disubstituted by $C_1$–$C_6$-alkyl or phenyl.

Substituted aryl (as $R_2$, $R_2'$, $R_3$, $R_4$, $R_5$, $R_6$, $R_7$ or $R_8$), substituted cycloalkyl (as $R_2$, $R_2'$, $R_3$, $R_4$, $R_5$, $R_6$, $R_7$ or $R_8$) and substituted aralkyl (as $R_2$, $R_2'$, $R_3$, $R_4$, $R_5$, $R_6$, $R_7$ or $R_8$) represent aryl, cycloalkyl or aralkyl which can be substituted not only by the substituents mentioned above for alkyl but, for example, also by $C_1$–$C_6$-alkyl.

$R_2'$ preferably denotes $C_1$–$C_5$-alkyl, which is optionally substituted by acetoxy, $C_1$–$C_4$-alkoxy, phenoxy, cyclohexyloxy, phenyl-$C_1$–$C_2$-alkoxy, bromine or chlorine, or allyl, cyclohexyl or phenyl-$C_1$–$C_2$-alkyl.

Further dyestuffs which can preferentially be used as light converters are:

(a) Coumarin derivatives of the formula (I) in which $R_2$ and $R_3$ together with the N atom and optionally with the inclusion of further hetero-atoms form a 5-membered or 6-membered ring, it being possible for this ring to carry non-ionic substituents and for an optionally substituted benzene ring or an optionally substituted naphthalene ring to be fused thereto, and (b) Dyestuffs of the formula

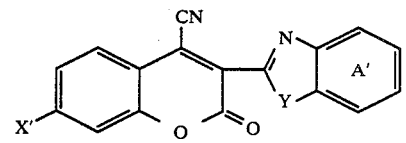
(III)

in which
X' signifies

or —O—$R_2'''$, in which
$R_2''$ represents hydrogen or $C_1$–$C_4$-alkyl, especially methyl and ethyl,
$R_3'$ represents $C_1$–$C_4$-alkyl, especially methyl and ethyl, $C_1$–$C_4$-alkylsulphonyl or phenylsulphonyl and
$R_2'''$ represents $C_1$–$C_4$-alkyl, especially methyl and ethyl;
Y' signifies O, N$R_5'$ or S and
$R_5'$ signifies $C_1$–$C_4$-alkyl, especially methyl, or phenyl,
and in which
the ring A' can be substituted by $C_1$–$C_4$-alkyl, especially methyl, $C_1$–$C_4$-alkoxy, especially methoxy, halogen, especially chlorine, $C_1$–$C_4$-alkylsulphonyl, especially methylsulphonyl, or sulphamoyl.

The compounds of the formula (I) which can be used according to the invention as energy converters in light-collecting systems are known (see, for example, German Offenlegungsschrift (German Published Specification) No. 2,844,299) or can be prepared by processes analogous to those disclosed in the literature.

A new process for the preparation of dyestuffs of the formula (I) in which X represents —$OR_2'$ is characterized in that compounds of the formula

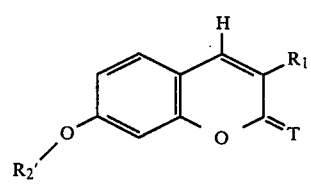
(IV)

in which
$R_1$, $R_2'$ and T possess the abovementioned meaning, are reacted in a polar organic solvent in a manner which is in itself known (compare DE-OS (German Published Specification) No. 2,844,299) with cyanide salts and, at the same time or subsequently, are treated with oxidising agents.

Suitable polar organic solvents are alcohols, such as methanol, ethanol, isopropanol, 2-methoxy-ethanol, 2-ethoxy-ethanol, ethylene glycol and 2-cyano-ethanol, but especially dipolar aprotic organic solvents, such as dimethylformamide and also pyridine and picolines.

Intermediate isolation of the cyanide adduct is not necessary.

Suitable oxidizing agents are, for example, atmospheric oxygen, hydrogen peroxide, persulphates, perborates, nitric acid, bromine, sulphuryl chloride, lead tetraacetate and chloranil.

The cyanide salts used are advantageously watersoluble cyanides, especially alkali metal cyanides.

The reaction of the cyanide salts is carried out in the temperature range of 0° to 120° C., preferably at 10° to 60° C., and the oxidation is carried out in the range from −5° to 30° C., preferably at 0° to 15° C.

The starting dyestuffs of the formula (IV) are known or can be prepared by known processes.

Relevant patent publications are, for example, U.S. Pat. Nos. 3,014,041, 3,288,801, 3,496,188, 3,816,413, 3,839,333, 3,669,621, 3,704,302, 3,839,351, 3,776,905, 3,968,119, and 4,055,568 and British Pat. Nos. 1,269,004, 1,313,253 and 1,318,975.

The new light-collecting systems, which are shaped bodies of suitable geometry, that is to say optical systems, in which the ratio of the emission surface to the absorption surface can be 1:50 to 1:2,000, are suitable for absorbing incident diffuse electromagnetic radiation and emitting it virtually without loss in a medium which has a higher optical density than the surroundings, as a result of which the bulk of the emitted light remains totally reflected in the medium.

Only that part of the emitted light for which the emission band is substantially free from absorption is usable for the purpose according to the invention.

Therefore, it is appropriate to subject the dyestuffs of the formula (I) to special purification before they are used in the light-collecting systems. In particular, they must be substantially free from impurities which absorb in the long-wave region.

Accordingly, the invention preferentially relates to light-collecting systems which are characterized in that they contain a dyestuff of the formula (I), which, in a 0.05% strength solution, for example in chloroform, measured in a layer thickness of 10 cm, displays an increase in the transmission from 0% to >90% for a change in the wavelength of 25–100 nm and preferably of 25–45 nm.

In advantageous cases, the dyestuffs can be purified by repeated careful crystallization.

Usually, separation by column chromatography on solid carriers such as $Al_2O_3$ or $SiO_2$ is necessary. High degrees of purity are obtained under particularly mild conditions by partition chromatography, for example by steady state (O'Keefe) partition or Craig countercurrent distribution.

The new light-collecting systems can be used, for example, in combination with solar cells for the utilization of solar energy and in scintillators of known types [see, for example, J. B. Birks: The Theory and Practice of Scintillation Counting (Pergamon Press, London 1964); J. Opt. Am. 39, 912 (1949); J. Appl. Phys. 40, 3544 (1969); Nuclear Instruments a. Methods 87, 111–123 (1970) Research Disclosure, page 43 (1977); and DE-OS (German Published Specification) No. 2,629,641)]. In addition, they are suitable, in combination with electronic controls, as display devices with very low energy consumption, and they are also suitable without electronic components for very diverse display, indication and marking purposes, for example in passive display elements, indicators and traffic signs, such as traffic lights.

The light-collecting systems according to the invention contain the dyestuff dissolved in a liquid or a solid and, depending on the field of application of the light-collecting system, very diverse geometric shapes are possible. Suitable solid media, such as are used, for example, for collecting light in combination with solar cells and in passive display elements, are, for example, plastics which transmit light and can be used optically, such as homopolymers and copolymers of acrylic acid (derivatives) or polycarbonates. Furthermore, the light-collecting systems can also contain the dyestuff dissolved in a liquid—for example an alcohol, ketone, halogenated hydrocarbon or ether. Very suitable solvents are, for example, ethanol, propanol, methyl ethyl ketone, acetone, cyclohexanone, chloroform, perchloroethylene and glycol monomethyl ether.

The use of the dyestuffs of the formula (I) in solids is preferred.

The use, according to the invention, of the dyestuffs of the formula (I) is highly advantageous since, in addition to a good quantum yield and a high intensification factor, they display excellent fastness to light and thus ensure that the new light-collecting systems can be used economically.

A particular characteristic is the very large Stokes shift, even with long-wave absorption, coupled with very good fastness to light.

It must be regarded as surprising that the dyestuffs of the formula (I) are suitable for advantageous use in light-collecting systems, since numerous highly fluorescent dyestuffs, such as, for example, rhodamine G, cannot be used. Likewise, the already very extensive demands which are made in respect of the optical quality of laser dyestuffs are in many cases not sufficient to enable the use of these dyestuffs in light-collecting systems to be recommended.

EXAMPLE 1

4 g of 3-(6-methyl-benzoxazolyl)-4-cyano-7-diethylamino-coumarin are dissolved in 60 ml of chloroform and the solution is subjected to chromatography on 800 g of silica gel (Merck). The eluant is 3:1 ethyl acetate/methanol. 3.2 g of product are obtained and this is recrystallized from n-butanol. Melting point: 213° C.

500 mg of the compound are dissolved in 1 l of chloroform and the transmission T is measured in a layer thickness of 10 cm. The transmission is 0% at 595 nm and 94% at 625 nm. The fluorescence quantum yield $\Phi$ is 0.70, the Stokes shift $\Delta$ is 69 nm and the proportion of usable fluoroscence is 65%. The "proportion of usable fluorescence" is understood as meaning the percentage of the fluorescent light originally emitted which is not lost by reabsorption.

Analogously to Example 1, the values indicated are obtained for the compounds listed in the table which follows.

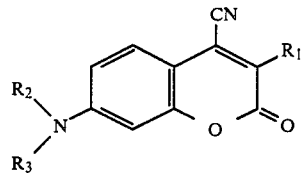

| Example No. | R$_2$ | R$_3$ | R$_1$ | Φ Fl | Δ [nm] | T [%] | Proportion of usable fluorescence [%] | Melting point |
|---|---|---|---|---|---|---|---|---|
| 2 | C$_2$H$_5$ | C$_2$H$_5$ | 2-benzothiazolyl | 0.81 | 52 | 92 | 57 | 254° |
| 3 | C$_2$H$_5$ | C$_2$H$_5$ | 6-methoxy-2-benzothiazolyl | 0.51 | 79 | 85 | 72 | 279° |
| 4 | C$_2$H$_5$ | C$_2$H$_5$ | 2-benzoxazolyl | 0.61 | 51 | 92 | 64 | 292° |
| 5 | C$_2$H$_5$ | C$_2$H$_5$ | 6-chloro-2-benzoxazolyl | 0.78 | 68 | 92 | 61 | 259° |
| 6 | | | 5-methyl-2-benzoxazolyl | 0.95 | 100 | 82 | 80 | 265° |
| 7 | (C(C$_6$H$_5$)=N–, C(CH$_3$)=N–) | | 2-benzothiazolyl | 0.52 | 88 | 94 | 69 | 258° |
| 8 | | | 5-chloro-2-benzoxazolyl | 0.97 | 102 | 94 | 79 | 233° |
| RHODAMINE B | | | | 0.61 | 20 | 98 | 24 | |

Analogously to Example 1, the following compounds are also suitable for use in light-collecting systems:

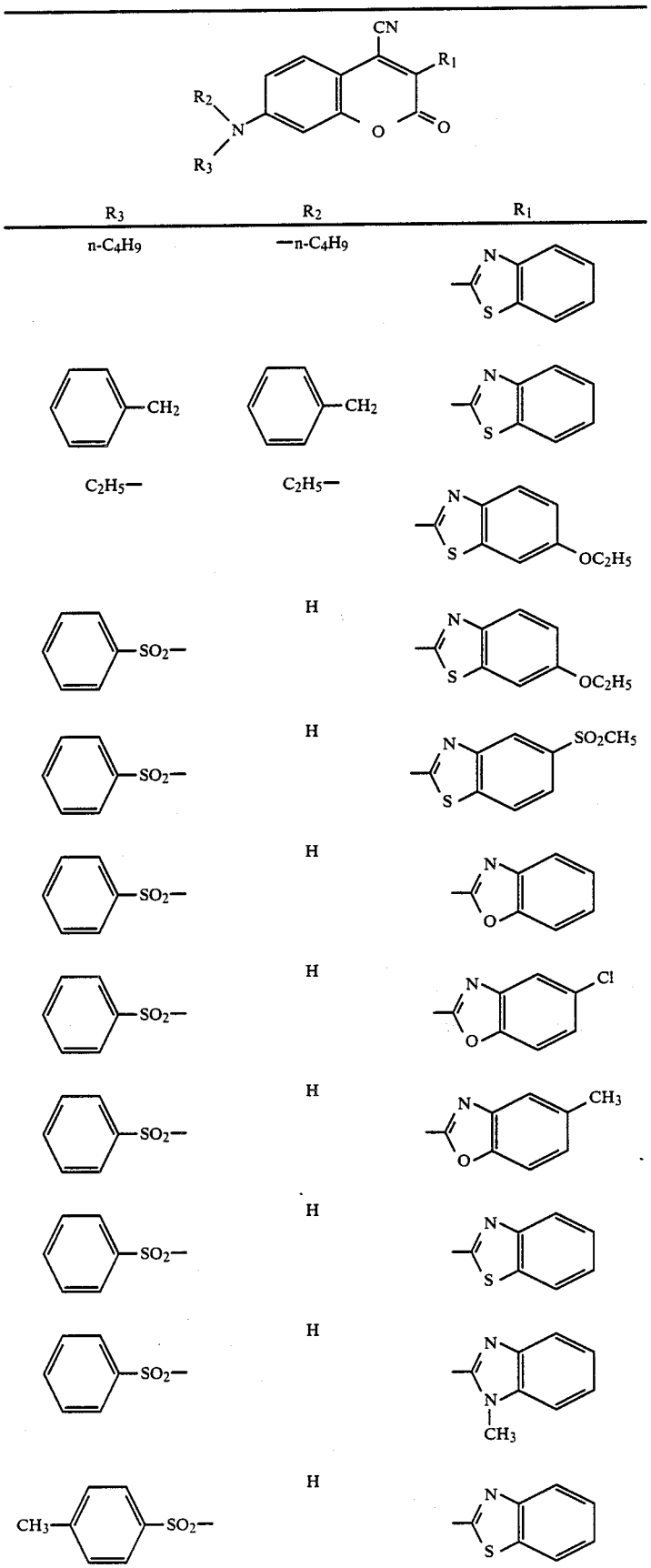

-continued

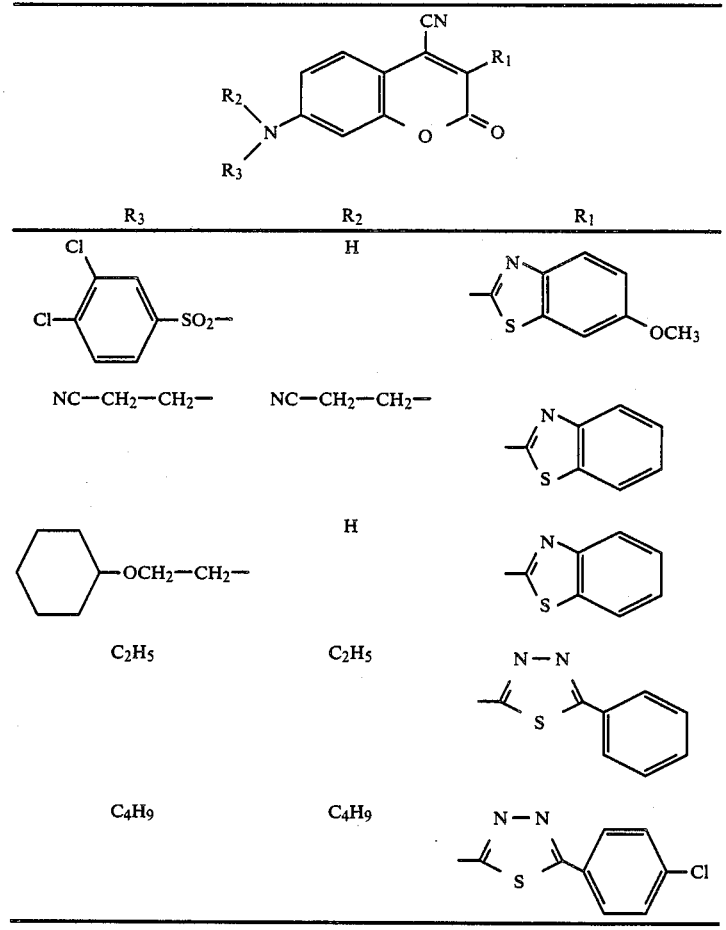

| R3 | R2 | R1 |
|---|---|---|
| 3,4-dichlorophenyl-SO2— | H | 2-methyl-6-methoxy-benzothiazol-yl |
| NC—CH2—CH2— | NC—CH2—CH2— | 2-methyl-benzothiazol-yl |
| cyclohexyl-OCH2—CH2— | H | 2-methyl-benzothiazol-yl |
| C2H5 | C2H5 | 5-methyl-2-phenyl-1,3,4-thiadiazol-yl |
| C4H9 | C4H9 | 5-methyl-2-(4-chlorophenyl)-1,3,4-thiadiazol-yl |

EXAMPLE 9

19.2 g of 6-methoxy-3-(benzthiazol-2-yl)-4-cyano-7-ethoxy-coumarin are dissolved in 1,200 ml of dichlorobenzene, and 0.5 g of tonsil is added. The mixture is filtered hot and, after cooling, 15.1 g of crystals are obtained. This crystallization repeated twice, the Tonsil being omitted in the last crystallization. The yellow crystals have a melting point of 302° C.

488 mg of the compound thus obtained are dissolved in 1 l of chloroform and the transmission T is measured in a layer thickness of 10 cm. The transmission is 0% at 550 nm and 92% at 580 nm. The fluorescence quantum yield Φ is 1.00, the Stokes shift Δ is 135 nm and the proportion of usable fluorescence is 88%. The "proportion of usable fluorescence" is understood as meaning the percentage of the fluorescent light originally emitted which is not lost by reabsorption.

Analogously to Example 9, the values indicated are obtained for the compounds listed in the table which follows.

| $R_2'$ | $R_1$ | Φ [%] | Stokes [nm] | T % | Usable fluorescence % | Melting point °C. | Example No. |
|---|---|---|---|---|---|---|---|
| CH3— | benzothiazol-2-yl | 0.63 | 92 | 96 | 76 | 276 | 10 |
| C2H5— | benzothiazol-2-yl | 0.48 | 93 | 95 | 67 | 215 | 11 |

-continued

[Structure: benzene ring with CN and R₁ substituents on a side chain with carbonyl group, and R₂'—O— on the ring]

| R₂' | R₁ | Φ [%] | Stokes [nm] | T % | Usable fluorescence % | Melting point °C. | Example No. |
|---|---|---|---|---|---|---|---|
| CH₃— | 2-methylbenzoxazole-6-SO₂NH₂ | 0.75 | 119 | 90 | 82 | 287 | 12 |
| CH₃— | 2-methylbenzoxazole-6-SO₂C₂H₅ | 0.87 | 100 | 90 | 65 | 212 | 13 |
| CH₃— | 2-methyl-5,7-dichlorobenzoxazole | 0.86 | 99 | 92 | 73 | 254 | 14 |
| CH₃— | 2-methyl-5-chlorobenzoxazole | 1.0 | 100 | 95 | 84 | 252 | 15 |
| CH₃— | 2,5-dimethylbenzoxazole | 0.71 | 114 | 94 | 87 | 230 | 16 |
| CH₃— | 2-methylbenzoxazole | 0.75 | 119 | 95 | 85 | 244 | 17 |
| C₂—H₅— | 2-methyl-5-chlorobenzoxazole | 0.79 | 100 | 97 | 72 | 217 | 18 |
| C₂—H₅— | 2-methylbenzoxazole | 0.89 | 100 | 95 | 83 | 211 | 19 |
| CH₃— | quinazolinone derivative | 0.88 | 84 | 93 | 77 | 309 | 20 |

Analogously to Example 9, the following compounds are also suitable for use in light-collecting systems:

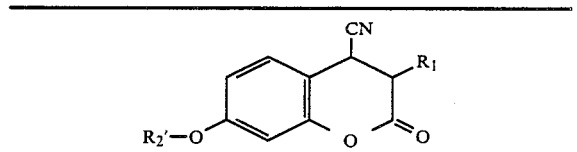
| $R_2'$ | $R_1$ |
|---|---|
| n-C$_4$H$_9$ | 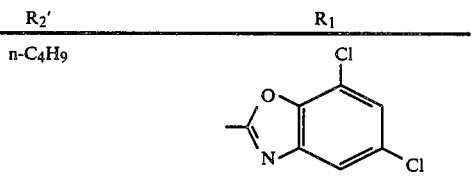 |
| 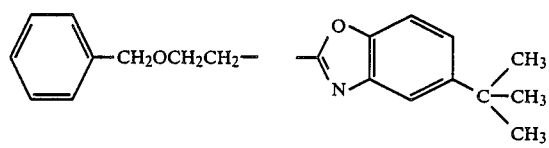 | |
| 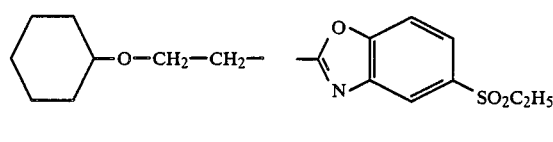 | |
| C$_2$H$_5$ | 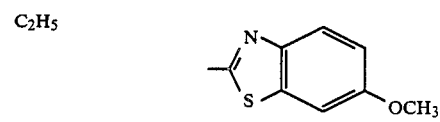 |
| 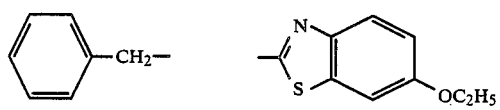 | |
| CH$_3$OCH$_2$CH$_2$— | 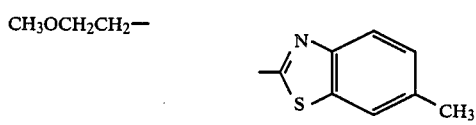 |
| n-C$_4$H$_9$ | 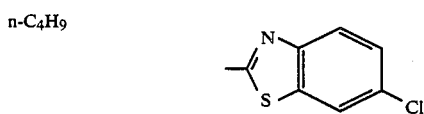 |
| CH$_2$=CH—CH$_2$ | 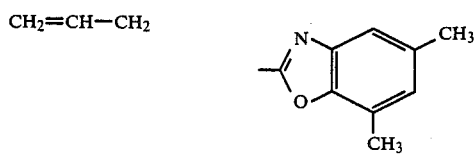 |
| Cl—CH$_2$—CH$_2$— | 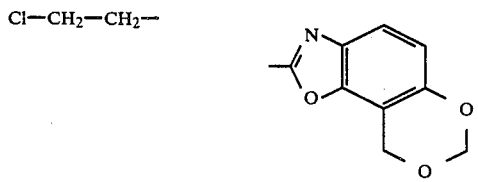 |
| CH$_2$=CH—CH$_2$— | 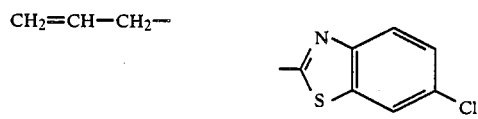 |

-continued

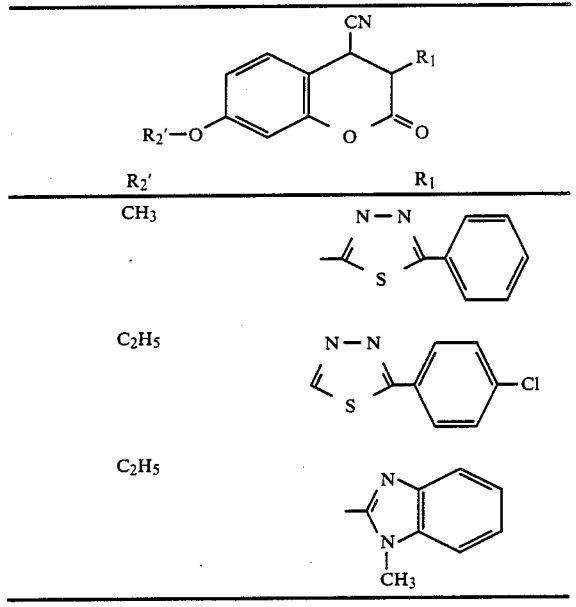

| $R_2'$ | $R_1$ |
|---|---|
| CH$_3$ | (N—N, S, phenyl structure) |
| C$_2$H$_5$ | (N—N, S, 4-chlorophenyl structure) |
| C$_2$H$_5$ | (N-methylbenzimidazol-2-yl structure) |

We claim:
1. A coumarin derivative of the formula

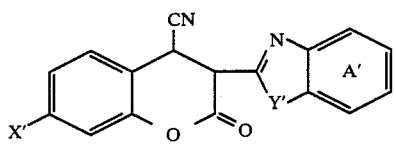

in which
X' signifies

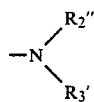

or —OR$_2'''$ in which
  R$_2''$ represents hydrogen or C$_1$-C$_4$-alkyl;
  R$_3'$ represents C$_1$-C$_4$-alkylsulphonyl or phenylsulphonyl;
  R$_2'''$ represents C$_1$-C$_4$-alkyl;
  Y' signifies O, NR$_5'$ or S and
  R$_5'$ signifies C$_1$-C$_4$-alkyl or phenyl and in which the ring A' is unsubstituted or substituted by C$_1$-C$_4$-alkyl, C$_1$-C$_4$-alkoxy, halogen, C$_1$-C$_4$-alkylsulphonyl or sulphamoyl.

2. A coumarin derivative of the formula

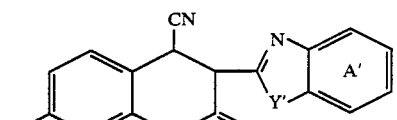

in which
X' signifies

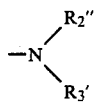

or —OR$_2'''$ in which
  R$_2''$ represents hydrogen or methyl and ethyl;
  R$_3'$ represents methyl and ethyl, C$_1$-C$_4$-alkylsulphonyl or phenysulphonyl;
  R$_2'''$ represents methyl or ethyl;
  Y' signifies O, NR$_5'$ or S and
  R$_5'$ signifies methyl or phenyl and in which the ring A' is unsubstituted or substituted by methyl, methoxy, chlorine, methylsulphonyl, or sulphamoyl.

* * * * *